United States Patent [19]

Marcantonio

[11] 4,404,627
[45] Sep. 13, 1983

[54] INTERRUPT SIGNAL GENERATING MEANS FOR DATA PROCESSOR

[75] Inventor: Angelo R. Marcantonio, Princeton, N.J.

[73] Assignee: RCA Corporation, New York, N.Y.

[21] Appl. No.: 38,282

[22] Filed: May 11, 1979

[51] Int. Cl.³ .................... G06F 13/00; G06F 3/00
[52] U.S. Cl. .................................................. 364/900
[58] Field of Search .............. 324/73 R; 205/92 DP; 364/200 MS File, 900 MS File, 550, 101, 483, 103, 119, 20, 24, 26, 27; 371/20, 24, 26, 27, 28, 15

[56] References Cited

U.S. PATENT DOCUMENTS

| | | | |
|---|---|---|---|
| Re. 28,221 | 11/1974 | Benghiat | 364/550 X |
| 3,693,163 | 9/1972 | Johnson et al. | 364/103 X |
| 3,711,691 | 1/1973 | Breitenbach et al. | 371/20 |
| 3,927,371 | 12/1975 | Pomeranz et al. | 324/73 R |
| 4,002,974 | 1/1977 | Thomas | 324/73 R |
| 4,012,625 | 3/1977 | Bowen et al. | 324/73 R X |
| 4,041,288 | 8/1977 | Conway et al. | 364/484 |
| 4,044,244 | 8/1977 | Foreman et al. | 371/20 |
| 4,064,394 | 12/1977 | Allen | 364/107 |
| 4,092,589 | 5/1978 | Chau et al. | 324/73 R |
| 4,099,668 | 7/1978 | Feilchenfeld et al. | 324/73 R X |
| 4,102,491 | 7/1978 | DeVito et al. | 371/20 |
| 4,115,847 | 9/1978 | Osder et al. | 364/101 |
| 4,156,132 | 5/1979 | Hazzard | 324/73 R X |
| 4,168,527 | 9/1979 | Winkler | 364/580 |

Primary Examiner—Gareth D. Shaw
Assistant Examiner—John Mills
Attorney, Agent, or Firm—Samuel Cohen; Joseph S. Tripoli; Donald W. Phillion

[57] ABSTRACT

An interrupt signal generating means comprising a digital-to-analog (D/A) converter and means for supplying to said D/A converter a series of binary numbers at least some of which point to service subroutines in a data processor, and when converted to dc voltages by the D/A converter have values which are equal to dc voltages originating in various peripheral devices which indicate a need for servicing by certain ones of the processor subroutines. A plurality of voltage comparators compare the dc output of the D/A converter with the condition indicating voltages generated by the peripheral devices and when equality of dc voltages occurs on the inputs of a given voltage comparator, an interrupt signal is generated and supplied to the processor which then accesses the subroutine pointed to by the corresponding binary number.

5 Claims, 2 Drawing Figures

INTERRUPT SIGNAL GENERATING MEANS FOR DATA PROCESSOR

This invention relates generally to data processing interrupting means and more particularly to a system for interrupting a data processor when various conditions occur in peripheral devices with means for simultaneously and automatically identifying the service subroutine in the processor required to service the condition.

There are many prior art structures for interrupting normal processor operation upon the occurrence of certain conditions in peripheral devices. Many of these systems include various digital circuits that provide a means for identifying the source of the interrupt and the address of the appropriate subroutine. However, most of these prior art devices are relatively complex and such complexity increases with the number and variety of interrupts employed.

The present invention overcomes much of the complexity and limitations of the prior art by enabling the processor to track a large number of analog voltage levels, each of which represents a condition of a peripheral device requiring servicing, and automatically provides a vector means which points to the appropriate service subroutine for the specific condition which must be serviced.

In accordance with a preferred form of the invention, there is provided an interrupt means in a system which includes a data processor having an interrupt input terminal, address and data busses and a plurality of service routines designed to service various conditions which occur in the system, with each condition being indicated by the generation of a condition indicating voltage as, for example, from a pressure gauge transducer.

The interrupt means comprises means for generating a series of binary numbers, at least some of which point to service subroutines in the processor, and also comprises means for generating from said binary numbers dc voltages having values which individually are equal to one of said condition indicating voltages. A plurality of voltage comparators each having first and second input terminals each receive one of said condition indicating voltages on a first terminal and dc voltages generated from the binary numbers on the second terminal. When a generated dc voltage is equal to a particular condition indicating voltage on a given voltage comparator, an interrupt signal is supplied from said given voltage comparator to the interrupt input terminal of the processor. Simultaneously the binary number points to the address of the service subroutine required to respond to the condition indicated by the said particular condition indicating voltage.

Figure 1:
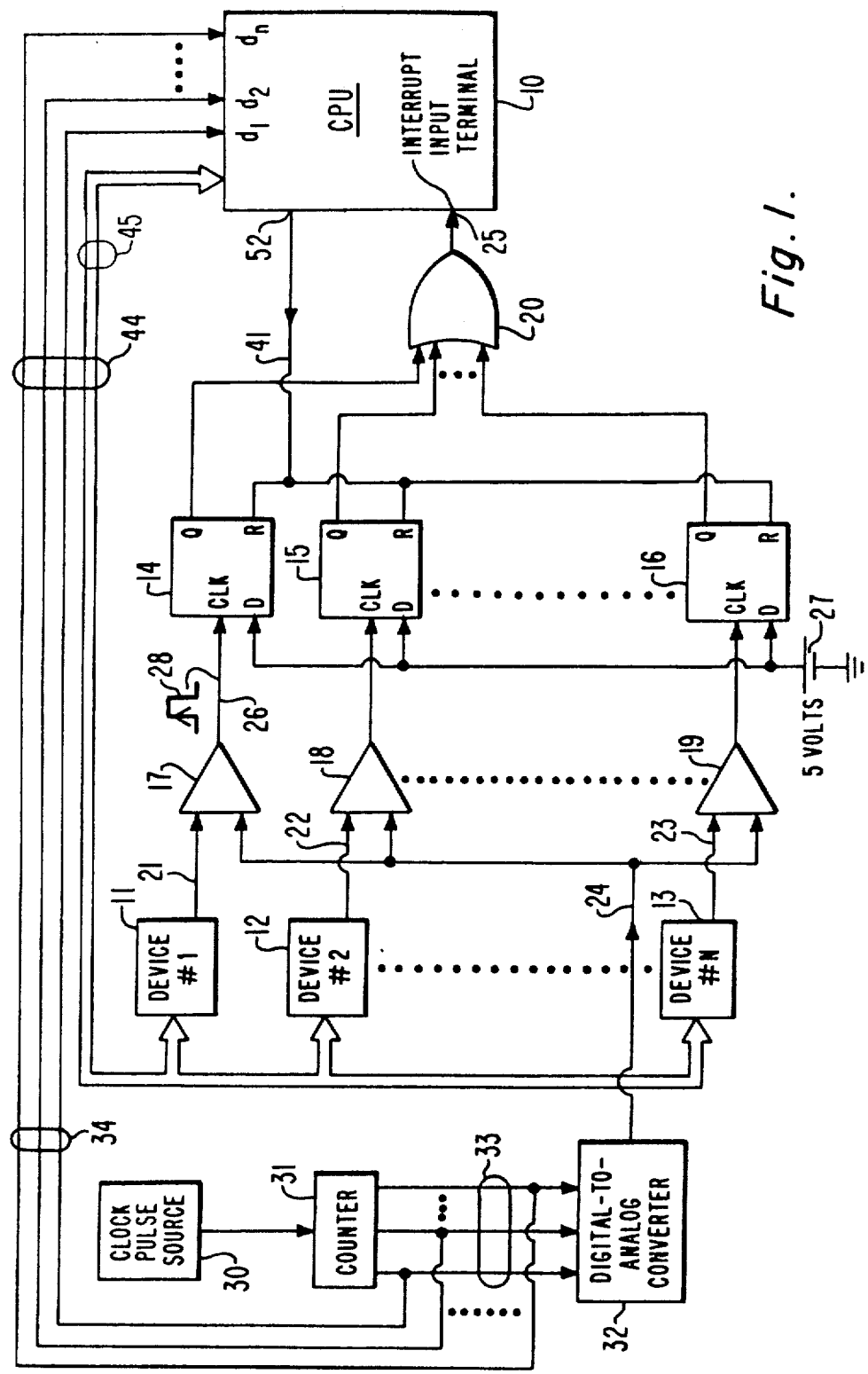
FIG. 1 is a block diagram of a system embodying one form of the invention.

In FIG. 1 a processor (CPU) 10 forms a part of a system which includes devices 11, 12 and 13 which can be, for example, a transducer means associated with a pressure gauge, a temperature indicating means, etc. These transducer means, under certain conditions, will supply condition indicating signals to voltage comparators 17, 18 and 19, respectively, indicating that some service is required from processor 10, usually via data bus 44. The processor 10 contains a series of service subroutines which are designed to respond, through appropriate logic, to condition indicating output voltages originating in devices 11, 12 and 13 to provide the required service.

The condition indicating voltages originating in devices 11, 12 and 13 are supplied, respectively, to first terminals 21, 22 and 23 of voltage comparators 17, 18 and 19, each of which will produce an output signal when an equal dc signal is supplied to the second input terminal thereof from digital-to-analog (D/A) converter 32.

The levels of the condition indicating voltages from devices 11, 12 and 13 are all different and each indicates a particular condition which exists in the originating device and which requires service from an appropriate subroutine stored in the main memory of processor 10.

In FIG. 1 the correct service subroutine is determined by logic means including clock pulse source 30, counter 31 and the digital-to-analog (D/A) converter 32. The clock pulse source 30 supplies pulses to counter 31 which cyclically counts through its capacity $2^n$, where n is the number of bit positions in counter 31. The D/A converter 32 responds to each count value in counter 31 to produce a corresponding dc voltage on its output lead 24. This dc output voltage is supplied to the second terminals of all of the voltage comparators 17, 18 and 19 and can range from a low dc value corresponding to a zero count in counter 31 to a high dc value corresponding to a high count in counter 31. The range of voltages from the D/A counter 32 is large enough to include all of the condition indicating voltages generated by devices 11, 12 and 13.

When the dc voltage output from D/A converter 32 becomes equal to the condition indicating voltage on input lead 21 of voltage comparator 17, for example, the voltage comparator 17 will produce on its output terminal 26 a clock pulse 28 whose leading edge will clock the conventional D-type flip-flop 14, thereby raising the Q output thereof to its high level since the D input of flip-flop 14 is maintained at its high level at all times by +5 volt source 27. The high level of the Q terminal of flip-flop 14 is supplied through OR gate 20 to the input terminal 25 of processor 10 as an interrupt signal. The internal interrupt response logic of processor 10, which is a standard feature of most modern processors and well known in the art, will function to stop the processing of the main program instructions, save the status of the processor as it existed at the time of the interrupt, and in response to the address of the service subroutine requested, access and execute the addressed service subroutine. The operation of the processor will then be returned to processing the main program in accordance with the saved status. The address of the requested subroutine in the present invention is generated and supplied in the following manner.

Simultaneously with the occurrence of the interrupt signal, the output from counter 31 will be supplied via leads 34, which constitute part of the data bus 44, to input terminals $d_1 \ldots d_n$ of processor 10 and will have a value which points to the appropriate service subroutine of stored in the main memory of processor 10 for servicing the condition existing in device 11 through data bus 44, and employing appropriate read/write strobes and addressing means (not shown).

The definition of data bus 44, as employed herein, can also include an address bus since addresses are, in fact, transmitted therethrough.

After receipt of an interrupt signal due to a condition existing in device 11, the processor 10 will acknowledge such interrupt signal by supplying an acknowledgment signal from acknowledgment terminal 52 of processor 10 back to the reset input R of flip-flop 14 via lead 41 to reset flip-flop 14, thereby changing the Q output of flip-flop 14 to its low level.

Similarly, if a condition indicating voltage exists on terminal 22 of device 12, the output to voltage comparator 18 will supply an interrupt signal through OR gate 20 to processor 10 when the dc output of D/A converter 32 becomes equal to the condition indicating voltage on said output terminal 22 of device 12. Such condition indicating voltage ordinarily has a level different from the condition indicating voltages that would occur at the outputs of devices 11 or 13.

Simultaneously, with the occurrence of equality between the dc output of D/A converter 32 and the condition indicating voltage at the output of device 12, the binary output of counter 31 will indicate to processor 10, through address bus 34, the location in the processor's main memory of the service subroutine required to service device 12.

If needed, appropriate programming and/or logic can be provided to insure that the servicing of any given device will be completed before servicing of another device begins. For example, the output of D/A counter 32 can be disabled until servicing of a device is completed.

Figure 2:
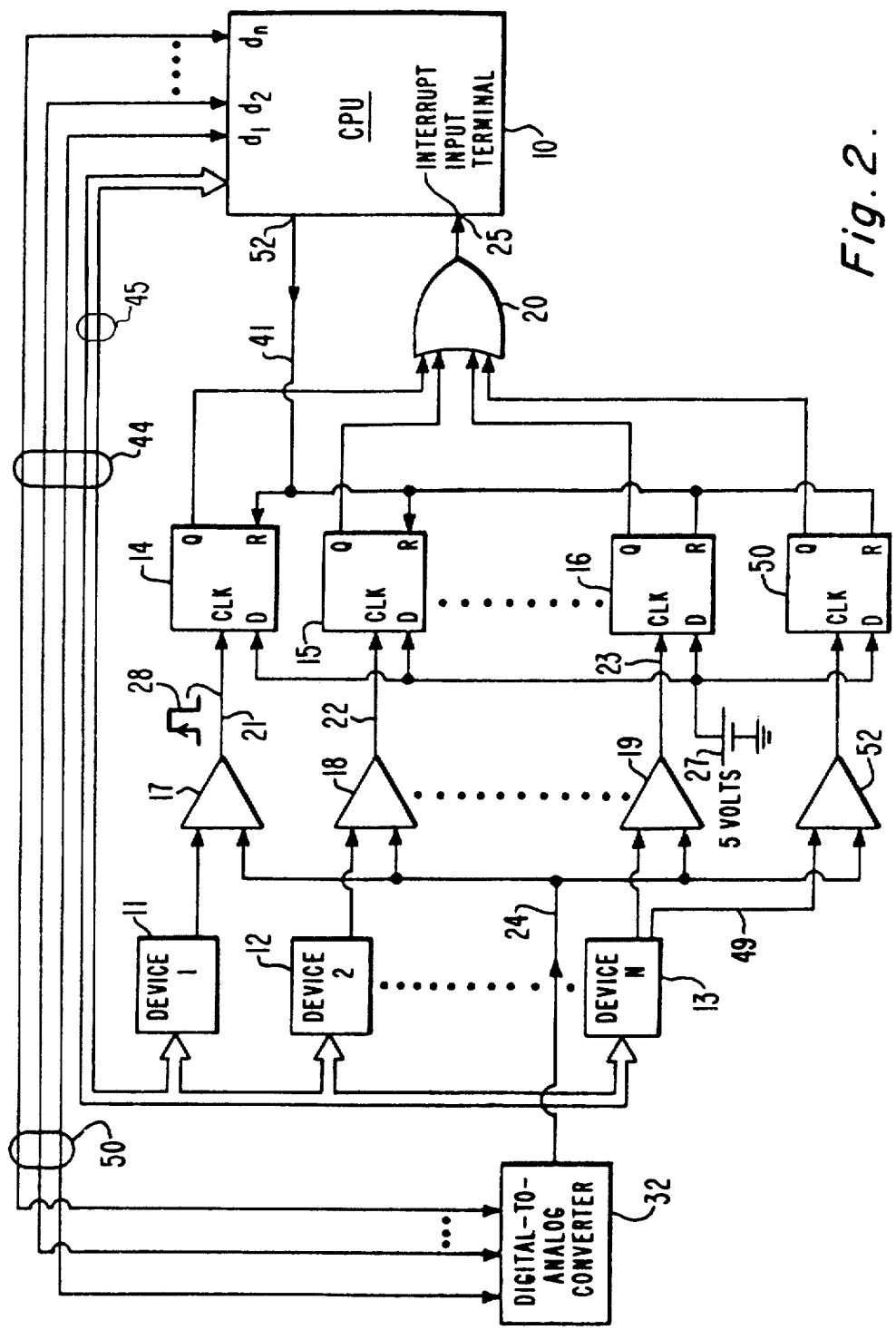
FIG. 2 is a block diagram of a system embodying another form of the invention.

Referring now to FIG. 2, there is shown a system embodying another form of the invention. Much of the structure of FIG. 2 is similar to the structure shown in FIG. 1 and corresponding elements are identified by the same reference characters. The principal difference between the structures of FIG. 1 and FIG. 2 is that the binary number supplied to the D/A converter 32 is generated by processor 10. More specifically, processor 10 outputs on leads 50, which constitute a part of data bus 44, a series of binary values which successively cause the D/A counter 32 to generate a series of dc voltage outputs which are successively equal to the condition indicating output voltages which would be generated by devices 11, 12 and 13, should such conditions requiring service exist. Thus, the processor 10 repeatedly polls each of the voltage comparators 17, 18 and 19 to determine if a condition indicating voltage is being supplied thereto from devices 11, 12 or 13. Thus, if a condition indicating voltage should exist at the output of device 11, the voltage comparator 17 will supply a pulse to the clock input 21 of D-type flip-flop 14 to change the Q terminal thereof to its high value when the dc output of D/A converter 32 becomes equal to such condition indicating voltage. The high level of the Q output of flip-flop 14 is supplied through OR gate 20 to interrupt input terminal 25 of processor 10. Such equality of voltages on the two inputs of voltage comparator 17 occurs when processor 10 supplies to D/A converter 32 the particular binary value which produces such an equal voltage. The processor 10 responds to the interrupt signal to access the service routine indicated by said particular binary number.

Receipt of the interrupt signal is acknowledged by processor 10 which supplied an acknowledgment signal via lead 41 to reset flip-flop 14. The processor 10 services the device 11 through data bus 45 in accordance with the condition indicated.

It is possible for each device to generate more than one condition indicating voltage to indicate two different conditions, such as upper and lower temperature limits, which require monitoring and/or servicing by processor 10. Thus, device 13 can have a second output terminal 49 through which a second condition indicating voltage can be supplied to voltage comparator 52. When the dc output of D/A converter 32 becomes equal to the aforementioned second condition indicating output voltage from device 13, the voltage comparator 52 will produce an output signal whose leading edge will clock flip-flop 50 and thereby raise the Q output of flip-flop 50 to its upper level which is supplied as an interrupt signal through OR gate 20 to interrupt input terminal 25 of processor 10. Processor 10 will respond to such interrupt signal to provide an acknowledgment signal via lead 41 to reset flip-flop 51 and, if required, will also provide a service routine through data bus 44.

It will be apparent to one skilled in the art that various other logic arrangements can be provided to supply the condition indicating voltages to the interrupt signal terminal of processor 10, and the acknowledgment signals without departing from the spirit or scope of the invention.

What is claimed is:

1. In a system comprising a plurality of devices each requiring periodic attention and indicating such requirement by generating a unique dc output voltage, a circuit for generating a first signal indicating that one of such devices has generated its unique output voltage and requires attention and for generating an address signal identifying which of the devices requires such attention and comprising:

first means for iteratively generating a predetermined series of binary values each consisting of N bits in parallel and each defining an identifying address signal identifying one of said devices;

second means responsive to said binary values to generate a predetermined series of dc reference voltages each coincident with and corresponding to one of said binary values and having a value which is equal to one of said unique dc output voltages;

logic means comprising a plurality of voltage comparators each having first and second input terminals;

means for supplying each of said unique dc output voltages to a selected one of said first input terminals and for supplying said dc reference voltages to all of said second input terminals;

said logic means responsive to the occurrence of substantially equal voltages being supplied to the first and second input terminals of one of said voltage comparators to generate said first signal; and utilization means responsive to the occurrence of each of said first signals to receive the binary value coincident therewith.

2. In a system comprising a plurality of devices each requiring periodic attention and indicating such requirement by generating a unique dc output voltage, a method for recognizing that one of such devices requires attention and for identifying which device requires the attention and comprising the steps of:

iteratively generating a predetermined series of binary values consisting of N bits in parallel and each defining a signal identifying one of said devices;

generating a predetermined series of reference dc voltages each in response to and coincident with one of said binary values and having a value which is equal to one of said unique dc output voltages;

comparing each of said unique dc output voltages with each of said reference dc voltages to determine any occurrence of equality therebetween;

generating a first signal when equality exists between any given one of said unique dc voltages and any given one of said reference dc voltages; and supplying the coincident binary value to a utilization means when such an equality exists.

3. In a system comprising a plurality of devices each indicating periodically required attention by generating a unique dc voltage, a circuit for generating a first signal indicating that one of such devices requires attention and an address signal identifying which one of the devices requires such attention and comprising:

first means for iteratively generating a predetermined series of binary values each consisting of N bits in parallel and each defining an identifying address signal identifying one said devices;

second means responsive to said binary values to generate a predetermined series of reference dc voltages each coincident with one of said binary values and having a value which is equal to one of said unique dc output voltages;

logic means comprising a plurality of voltage comparators each responsive to one of said unique dc voltages and to all of said reference dc voltages to generate said first signal when equality exists between any of said unique dc voltages and any of said reference dc voltages; and utilization means responsive to said first signal to receive the binary value coincident with the generation of said first signal.

4. In a system comprising a plurality of devices each requiring periodic attention and indicating such requirement by generating a unique dc voltage, a circuit for generating a first signal indicating that one of such devices requires attention and an address signal identifying said one of such devices and comprising:

first means for iteratively generating a predetermined series of binary values consisting of N bits in parallel and defining said identifying address signals;

second means responsive to said binary values to generate a series of reference dc voltages each time coincident with one of said binary values and having a value equal to one of said unique dc voltages;

logic means responsive to the simultaneous occurrence of a unique dc voltage and a reference dc voltage of equal value to generate said first signal; and utilization means responsive to said first signal to respond to the binary value occurring coincidentally with the generation of said first signal.

5. In a system comprising a plurality of devices each needing periodic attention and indicating such need by generating a unique dc output voltage, a method for recognizing that one of such devices needs attention and for identifying which device needs the attention and comprising the steps of:

iteratively generating a series of binary values each defining an address signal identifying a particular device;

generating a series of reference dc voltages each in response to and coincident with one of said binary values and having a value which is equal to that of one of said unique dc output voltages;

generating a first signal when equality exists concurrently between a unique dc voltage and a reference dc voltage; and utilizing the coincident binary value when said first signal is generated and such equality exists.

* * * * *

UNITED STATES PATENT AND TRADEMARK OFFICE
CERTIFICATE OF CORRECTION

PATENT NO. : 4,404,627
DATED : September 13, 1983
INVENTOR(S) : Angelo R. Marcantonio It is certified that error appears in the above-identified patent and that said Letters Patent is hereby corrected as shown below:

Column 2, line 62, delete "of" (first occurring).

Column 4, line 16, "flip-flop 51" should be --flip-flop 50--.

Signed and Sealed this

Twenty-eighth Day of February 1984

[SEAL]

Attest:

GERALD J. MOSSINGHOFF

Attesting Officer — Commissioner of Patents and Trademarks